United States Patent
Coleman et al.

[11] Patent Number: 5,820,437
[45] Date of Patent: Oct. 13, 1998

[54] WACKY POP NOISE MAKER

[76] Inventors: Thomas J. Coleman, 19170 Paddock Pl.; William K. Schlotter, IV, 20308 Alvarado Rd.; Princess Ann Coleman, 19170 Paddock Pl.; Ann M. Schlotter, 20308 Alvarado Rd., all of Abingdon, Va. 24211

[21] Appl. No.: 681,369

[22] Filed: Jul. 23, 1996

[51] Int. Cl.⁶ .................................................. A63H 5/00
[52] U.S. Cl. ........................... 446/196; 446/81; 446/202; 426/104; 426/134
[58] Field of Search ................ 446/71, 81, 202, 446/203, 205–208, 195, 196; 426/134, 104

[56] References Cited

U.S. PATENT DOCUMENTS

| | | | |
|---|---|---|---|
| 1,397,263 | 11/1921 | Carmody | 446/205 |
| 2,417,480 | 3/1947 | Friedman | 446/205 |
| 2,782,558 | 2/1957 | Harley | 446/207 |
| 3,670,617 | 6/1972 | Haile | 446/213 |
| 4,443,201 | 4/1984 | Diefenbach | 446/213 |
| 5,324,527 | 6/1994 | Coleman | 426/134 |
| 5,391,107 | 2/1995 | Coleman | 446/484 |
| 5,553,877 | 9/1996 | Huang | 280/33.997 |

FOREIGN PATENT DOCUMENTS 93011842  6/1993  WIPO ................................... 446/202

*Primary Examiner*—Robert A. Hafer
*Assistant Examiner*—Laura Fossum
*Attorney, Agent, or Firm*—Melvin L. Crane

[57] ABSTRACT

A Wacky Pop Noise Maker is a novelty toy and candy holding device designed to hold a sucker type candy and to make noise. The Wacky Pop comprises a hollow main housing with plastic rings with a noise maker in the housing between an upper end cap and a bottom end of the housing. The upper end includes an aperture and a sucker type candy. The sucker type candy is inserted into the aperture at the top of the upper end cap of the hollow main housing. The upper end cap also has small apertures around the top end of the cap to allow passage of air. The outside of the hollow main housing has plastic rings and the lower end of the housing is open with a plastic rod across the bottom. Inside the hollow main housing the noise maker slides freely when the holding device is shaken or when the air is pushed back and forth through the apertures in the top edge of the upper end cap producing a variety of noises. This combination of candy and a toy noise maker gives children twice the fun. The candy can be replaced.

15 Claims, 2 Drawing Sheets

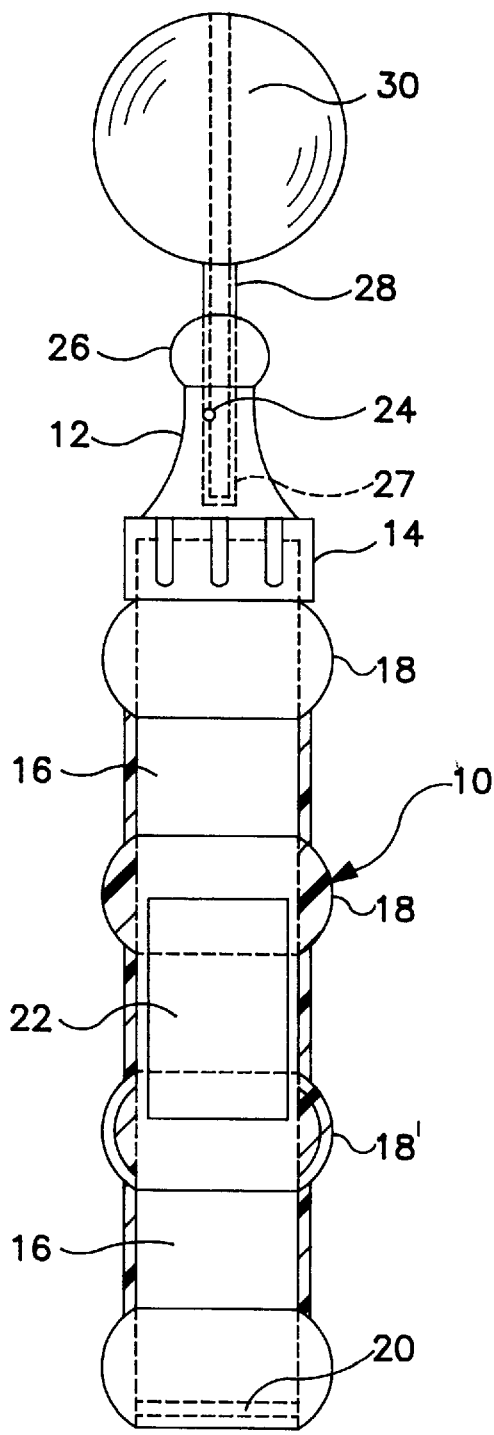
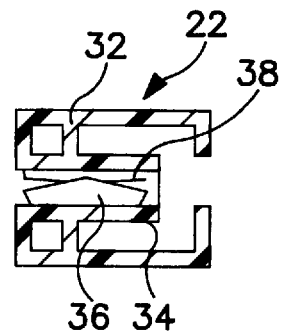
FIG. 4
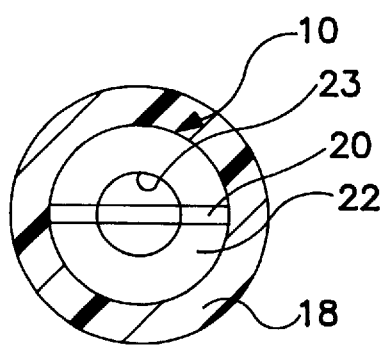
FIG. 3
FIG. 2

WACKY POP NOISE MAKER

This invention relates to a noise maker toy and more particularly to a combination noise maker toy and a candy sucker holder.

BACKGROUND OF THE INVENTION

Heretofore, noise makers of different types have been made and operated in combination with other elements. Some patents directed to such devices are as follows: U.S. Pat. Nos. 1,566,422; 1,593,240; 1,609,791; 1,675,358, 2,583,400, 2,710,487; 3,095,669; 3,172,232; 3,208,183; 3,415,000; and 3,564,762. These patents include noise makers such as whistles in which a passage of air through the device makes a noise. Some of these involve a balloon which is blown up and then when the air is released, the air passes through a noise maker. U.S. Pat. No. 3,172,232 is the closest in operation to the inventive device. This device includes a movable element in a tube by which the movable element rocks from side-to-side as it moves along the tube to make a noise as the movable element moves from side-to-side and the air passes the movable element.

SUMMARY OF THE INVENTION

This invention is directed to a combination noise maker and candy sucker holder. The device includes an elongated tubular housing having cylindrical portions that separate larger diametric solid or hollow rings that have the same inner diameter as that of the cylindrical portions in order to provide a smooth cylindrical surface. The housing is enclosed at the top by an end cap which entends upwardly from the main body and is somewhat conical in shape. The end cap is enclosed by a somewhat cylindrical candy stick holder that has a cylindrical portion that extends into the conical end cap. The candy stick holder that is secured to the cap enclosure is provided with an axial aperture which receives an end of a candy sucker stick in order to hold the candy stick in place for consumption. The cap extension is provided with air holes through which air can pass. The bottom of the housing is open and has a cross piece which prevents a noise maker that slides along the housing from excaping from the bottom.

It is therefore an object of the invention to provide a combination noise maker and candy sucker holder by which a person can make a noise by shaking the device or by other means and can enjoy consumption of a sucker secured to the upper end of the housing.

Another object is to provide a combination noise maker and candy sucker holder which will make a noise by shaking the device when lifting the device for consumption of the candy as well as when lowering the device subsequent to consuming some or all of the sucker.

Still another object is to design the air passage holes in the cover so that different sounds are made by passage of the air during shaking the device and by movement of the noise maker element.

Other objects and advantages will become obvious to one skilled in the art upon review of the drawings and following specifications.

BRIEF DESCRIPTION OF THE DRAWINGS

FIG. 2 illustrates a partial cross-sectional view illustrating the relative parts and the movable noise maker;

FIG. 3 illustrates a bottom view looking toward the top enclosure; and

FIG. 4 illustrates a cross sectional view of the movable noise maker which includes a noise making device therein.

DETAILED DESCRIPTION OF THE INVENTION

Figure 1:
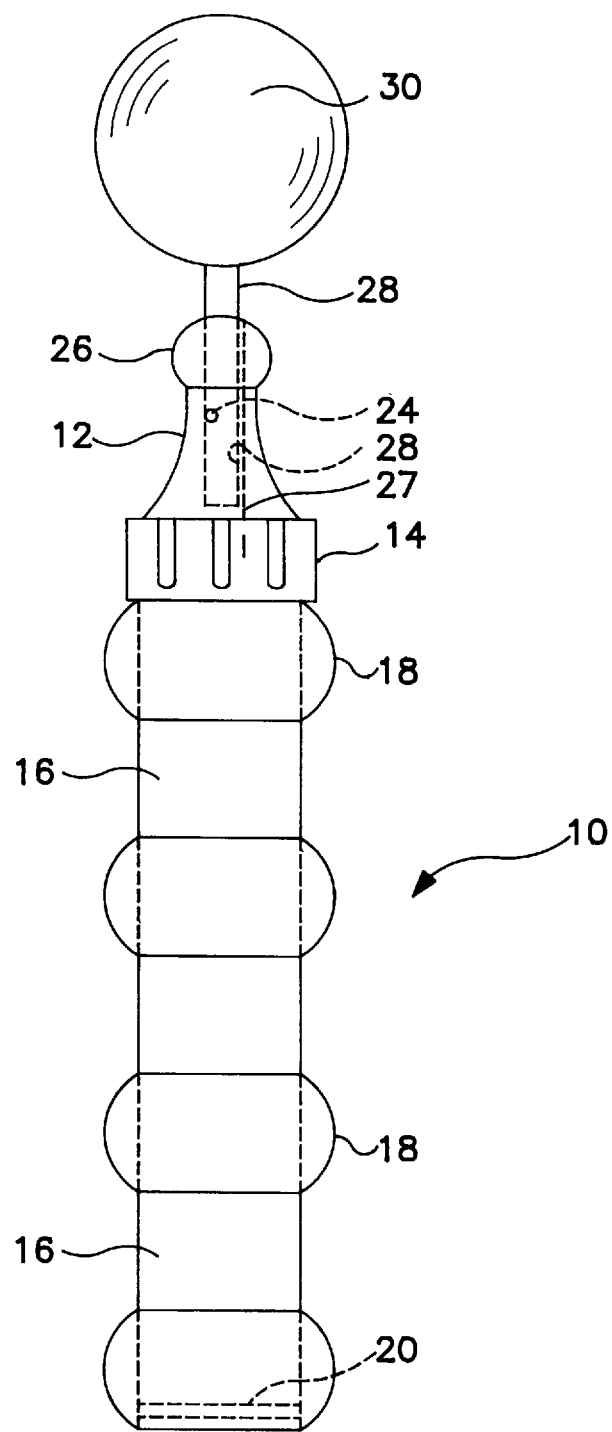
FIG. 1 illustrates a side view of the combination noise maker and candy sucker holder.

Now referring to the drawing wherein the same reference characters represent the same parts there is shown an elongated tubular housing 10 which has a threaded or non-threaded upper end to which an upper enclosure 12 is secured by a threaded nut 14 or by any other suitable means such as by a suitable glue. The housing is formed by tubular cylindrical sections 16 interspersed between integral solid or hollow rings 18, 18' which have the same inner diameter as the sections 16. The housing may be made of plastic or any other suitable material. The lowermost ring section 18 is provided with a cross piece 20 (see FIG. 3) across its diameter at the lowermost portion such that the tubular cylindrical noise maker element 22 which is inserted into the hollow housing from the upper end or before the cross is added so that the noise maker will not pass out from the bottom but will be retained in the housing when the cap is in place.

The noise maker 22 is shown in FIG. 4 which is a cross sectional view along a length of the noise maker. The noise maker includes a tubular cylindrical housing 32 which includes a tubular axial means 34 assembled within the housing. A reed device is secured within the tubular axial device. The reed includes a base element 36 with a vibrating element 38 secured onto the base. As air passes through the tubular axial means the vibrating element vibrates against the base so that a noise is made. The base and vibrating element are made so that the vibrating element will vibrate on each end of the base so that a notice will be made in each direction of movement of the noise maker. The noise maker moves within the housing 10 as shown by the arrows 40. The upper end of the cap 12 is shown with a cylindrical upper end 26 which has a portion that extends into the cap 12. The upper end 26 has an axial aperture 27 shown by dotted line which has a diameter which is sufficient to receive an end of a candy sucker stick 28 tightly so that the candy sucker 30 will not fall from the upper end of the cap. The candy stick and the candy pop or sucker can be provided with passages 42, 44 respectively so that a consumer can blow into the passage or suck on the passage so that the noise maker can move within the housing depending upon whether one is sucking on or blowing into the passage. The noise maker will make a noise due to the blowing or sucking.

The upper end cap can be provided with a plurality of air passages 24. The air passages could be of different size and/or shape and could be made to include a reed or something that would make a different sound as the air escapes through the apertures.

In operation, the cylindrical noise maker is inserted into the housing with the cap removed or with the cross piece 20 removed, then the cap is secured in place by use of the nut or some other means as the cross piece is then secured in the housing. A candy sucker is added by inserting the candy-free end of the stick into the axial aperture 27 of the upper end 26 of the cap. The device is now ready to make a noise and for consumption of the candy sucker. In order to make a noise, the housing is shook in an axial direction so that the noise maker 22 will move along the axis of the housing along the cylindrical portions and the ring portions. As the noise maker moves along the housing portions the noise maker contacts the inside of the housing which prevents air flow along the outer surface of the noise maker so that the air passes through the noise maker and out of the air holes 24 or the bottom of the housing depending on the direction of movement of the noise maker. The noise maker is provided with a vibrating reed or some other means for making a noise as the noise maker moves within the housing. As the noise maker moves in a direction of the bottom, air is forced through the noise maker to make a noise and out from the open bottom, and the cross piece 20 prevents the noise maker from passing from the housing. As the noise maker moves upwardly toward the cap, the air above the noise maker passes through the noise maker to make a noise and the remaining air is forced from the housing through the air passages or vents 24. As the air passes from the housing into the air vents, different noises can be made depending on the make-up of the vents which may include a vibrating device to make different noises.

Once the candy sucker has been consumed, the housing could be manipulated to-and-fro in order to move the noise maker within the housing in order to make a noise. Also, once the candy sucker has been consumed, the stick can be removed and replaced by another stick which contains a candy sucker thereon. The noise maker can be manipulated whether there is a candy sucker attached or whether there is no candy sucker attached. If there is no candy sucker stick inserted into the sucker stick holder, one can blow air into the aperture to make a noise or one can suck air through the aperture to make a noise. This is done without shaking the housing which is not necessary under these conditions.

In a modification of the noise maker, the noise maker could be a solid cylindrical piece and the noise making device could be a vibrating element or some noise making element fixed within the air vents of the housing so that the noise is made. As the solid cylinder moves within the housing, air is forced through the noise maker fixed in the air vents to make the noise.

In order to lower manufacturing costs, the parts can be made of plastic and should be made without any sharp edges or parts so that a person will not injure themselves during use of the device. It is also advisable that once the candy has been consumed that the candy sucker stick be removed from the end of the housing so that a user cannot be injured by the stick extending from the end of the housing.

For decorative purposes the housing and cap can be colored with different colors or of different art work such as a totem pole or any other design. The devise can be made without the ring sections; however, the ring sections assist in holding the device as it is shaken to make the noise. Any other outer configuration and decoration can be added without affecting the noise making operation.

What is claimed is:

1. A wacky pop noise maker which comprises:
   an elongated housing (10) having oppositely disposed open ends,
   said housing including a uniform inside cylindrical diameter of a constant dimension along its length,
   a cylindrical noise maker (22), for insertion into said housing, for movement along said cylindrical diameter,
   said cylindrical noise maker having an outside diameter substantially the same as said inside cylindrical diameter of said elongated housing,
   an end cap (12), which is secured to one of said open ends of said housing,
   said end cap having one end (26) of smaller diameter than said inside cylindrical diameter of said housing in an axial direction from said one of said open ends of said housing,
   said end cap including an axial bore (27) in said smaller diameter end,
   said axial bore in said smaller diameter end of said end cap having a size which is configured to receive and tightly secure a free end of a candy sucker stick,
   at least one air vent opening in said end cap that extends from said axial bore, and
   said at least one air vent opening is designed to make a noise as air passes through said at least one end cap opening.

2. A wacky pop noise maker as set forth in claim 1; in which
   said inside diameter of said housing and said outside diameter of said cylindrical noise maker are dimensioned and arranged for said noise maker to move along the entire length of said housing from said end cap to a rear bottom opening in the other of said open ends of said housing.

3. A wacky pop noise maker as set forth in claim 2; in which,
   said cylindrical noise maker is adapted to move from said end cap of said housing to said rear bottom opening of said housing during which a noise is made by movement of said cylindrical noise maker within said housing.

4. A wacky pop noise maker as set forth in claim 2; in which,
   said cylindrical noise maker has an axial passage from one end of said noise maker to another end of said noise maker which includes a noise making element therein.

5. A wacky pop noise maker as set forth in claim 1; in which, the other of said open ends is an open bottom end with a cross piece (20) extending across a diameter of said open bottom end that prevents said noise maker from escaping said bottom end.

6. A wacky pop noise maker as set forth in claim 5; in which,
   said cylindrical noise maker has an axial passage from one end of said noise maker to another end of said noise maker which includes a noise making element therein.

7. A wacky pop noise maker as set forth in claim 1; in which,
   said cylindrical noise maker has an axial passage from one end of said noise maker to another end of said noise maker which includes a noise making element therein.

8. A wacky pop noise maker as set forth in claim 1; in which
   said cylindrical noise maker is a solid cylinder, and wherein said at least one air vent includes a noise maker therein.

9. A wacky pop noise maker as set forth in claim 1; in which
   a candy sucker stick with a sucker on said candy sucker stick have a passage extending completely through said candy sucker stick and said sucker.

10. A wacky pop noise maker as set forth in claim 9; in which
    said cylindrical noise maker is a solid cylinder, and wherein said at least one air vent includes a noise maker therein.

11. A wacky pop noise maker as set forth in claim 1, in which said elongated housing is formed of a plurality of linear portions having alternating different outside diameters along its length.

12. A wacky pop noise maker as set forth in claim 11; in which said plurality of linear portions includes cylindrical sections interspaced between ring sections.

13. A wacky pop noise maker as set forth in claim 12; in which said ring section are of solid material.

14. A wacky pop noise maker as set forth in claim 12; in which said ring sections are hollow.

15. A wacky pop noise maker as set forth in claim 11; in which some of said ring sections are hollow and some of said ring sections are solid.

* * * * *